United States Patent
Lapinig

[15] 3,650,772
[45] Mar. 21, 1972

[54] PUMPKIN PICKLE

[72] Inventor: Stephanie N. Lapinig, 8976 215th Street, Queens Village, N.Y. 11427

[22] Filed: Feb. 3, 1970

[21] Appl. No.: 8,423

[52] U.S. Cl. ................................................99/156, 99/186
[51] Int. Cl. ............................................................A23b 7/00
[58] Field of Search ....................................99/156, 102, 186

[56] References Cited

UNITED STATES PATENTS

| | | | |
|---|---|---|---|
| 1,934,810 | 11/1933 | Mazzola | 99/186 |
| 915,186 | 3/1909 | King | 99/186 X |
| 3,102,034 | 8/1963 | Weinberg | 99/156 U |
| 2,444,875 | 7/1948 | Hayes | 99/156 |
| 1,829,932 | 11/1931 | Hey | 99/156 |

*Primary Examiner*—Howard R. Caine
*Attorney*—Charles E. Temko

[57] ABSTRACT

A process for converting pumpkin meat into a desirable flavored sweet-sour pickle, particularly with the use of specific spices. The process includes the chilling of the pumpkin in a brine with ice at 40° to 45° F. for approximately 5 hours or more to achieve crispness, subsequently draining and rinsing, partially cooking, and subsequently combining the partially cooked pumpkin with sugar, distilled white vinegar, water, cinnamon, cloves, allspice, mustard seed, nutmeg and ginger root.

1 Claims, No Drawings

PUMPKIN PICKLE

This invention relates generally to a new processed food product, a method for making the same, and more particularly to a process for making a pickle relish using pumpkin meat as the major constituent.

It is generally known in the art to form pickle relishes and the like by comminuting various fruits and vegetables, soaking the same in an edible pickling liquor, sometimes accompanied with the heating of the mixture, following which the pickling material is drained, and the food is mixed with desired spices and condiments. This process has been used in the pickling of such food products as cucumbers, cauliflower, pimiento, onions, beets, watermelon rind, but owing to the particular nature of pumpkin meat, little if any pickling of the same has been performed on a commercial basis.

It is therefore among the principal objects of the present invention to provide an expeditious and commercially practical method of preparing pickled pumpkin, susceptible of use on large scale for commercial operations.

Another object of the invention lies in the provision of a method for preparing a pickled food product capable of offering a relatively long shelf life.

Another object of the invention lies in the provision of an improved method of preparing and packaging pickled pumpkin, in which the products, when used by the consumer, may be of attractive and stable appearance, and which will not deteriorate during storage, and prior to consumption.

Yet another object of the invention lies in the provision of an improved method of the class described which is relatively inexpensive on a commercial scale.

These objects, as well as other incidental ends and advantages, will more fully appear in the progress of the following disclosure, and be pointed out in the appended claims.

Briefly stated, the process involves the selection of firm but ripe pumpkins, the paring of the same and removal of seeds. The pumpkin is then cubed, or cut in varying shapes, depending upon the intended use, and is soaked in a chilled brine to first achieve a crisp firmness for a period of 5 hours or longer. The pumpkin meat is subsequently drained and rinsed and partially cooked in water. The cooking water is then drained, and vinegar, and sugar and desired spices are added with fresh cold water, and the cooking completed.

The following example is illustrative.

EXAMPLE 1

Approximately ½ pounds of unpared firm but ripe pumpkin is selected. The seeds are removed, the pumpkin pared, and cubed to pieces approximately 1 by three-quarter by one-half inch. The resulting pumpkin meat will weigh approximately 1 and ⅛ pounds, and is of a volume approximating 1 quart. A brine is prepared, using one quart of cold water to one-quarter cup salt, and the pumpkin meat is immersed therein. The brine is maintained between 40° F. and 45° F. for 5 hours or longer until a crisp firmness is obtained. The pumpkin is then drained, and quickly rinsed using cold water.

Partial cooking of the pumpkin is obtained by placing the same in a saucepan, covered with cold water, approximately 1 quart. Over high heat, the water is brought to a full boil, uncovered; the heat is reduced and allowed to simmer uncovered at between 206° F. and 210° F. mixture temperature for approximately 5 minutes. The water is subsequently drained, and replaced by 2¾ to 3 cups sugar, 1 cup distilled white vinegar, 1 cup cold water, 3 sticks cinnamon, about 3 inches long, 1 teaspoon whole cloves, one-half teaspoon whole allspice, one-quarter teaspoon whole mustard seed, one-half of a whole nutmeg, and 1 lobe pared, fresh ginger root, about 1 inch long. The mixture and pumpkin meat is then returned to heat, brought to simmer, stirring just enough to dissolve the sugar. This mixture is maintained uncovered at 206° to 210° F. for 15 minutes, after which time the pumpkin is crisp and relatively tender. The ginger root is then removed, and the remaining mixture may be ladled into sterilized jars and sealed in a cool place. The yield is approximately 2½ cups.

On the basis of accelerated testing, by maintaining the mixture for 120 hours at 60° C., the product has a useful shelf life of 5 months or better. This may be improved further by additions of small amounts of vegetable gums or stabilizers known in the art.

I wish it to be understood that I do not consider the invention limited to the precise details set forth in this specification, for obvious modifications will occur to those skilled in the art to which the invention pertains.

I claim:

1. A method of preparing pumpkin pickle comprising the steps of: comminuting raw pumpkin to generally uniformly sized pieces, subjecting the same to a salt brine bath at between 40° to 45° F. for approximately 5 hours to achieve crispness, draining and rinsing the same, partially cooking the same for approximately 5 minutes at a mixture temperature of between 206° F. and 210° F., subsequently draining the same, and mixing with sugar, vinegar, water and spices selected from the group consisting of cinnamon, clover, allspice, mustard seed, nutmeg and ginger root, and further cooking at a mixture temperature of 206° to 210° F. for approximately 15 minutes.

* * * * *